United States Patent [19]

Mashtare

[11] Patent Number: 5,477,315
[45] Date of Patent: Dec. 19, 1995

[54] ELECTROSTATIC COUPLING FORCE ARRANGEMENT FOR APPLYING VIBRATORY MOTION TO A FLEXIBLE PLANAR MEMBER

[75] Inventor: Dale R. Mashtare, Macedon, N.Y.

[73] Assignee: Xerox Corporation, Stamford, Conn.

[21] Appl. No.: 270,278

[22] Filed: Jul. 5, 1994

[51] Int. Cl.⁶ .................................................. G03G 15/14
[52] U.S. Cl. ........................................ 355/273; 355/271
[58] Field of Search ............................... 355/212, 271, 355/273–275, 296; 118/652; 134/1; 310/310, 325

[56] References Cited

U.S. PATENT DOCUMENTS

| | | | |
|---|---|---|---|
| T893,001 | 12/1971 | Fisler | 134/1 |
| 3,113,225 | 12/1963 | Kleesattel et al. | 310/26 |
| 3,190,793 | 6/1965 | Starke | 162/278 |
| 3,422,479 | 1/1969 | Jeffee | 15/100 |
| 3,483,034 | 12/1969 | Ensminger | 134/1 |
| 3,635,762 | 1/1972 | Ott et al. | 134/1 |
| 3,653,758 | 4/1972 | Trimmer et al. | 355/273 |
| 3,713,987 | 1/1973 | Low | 435/294 |
| 3,733,238 | 5/1973 | Long et al. | 156/580 |
| 3,854,974 | 12/1974 | Sato et al. | 430/126 |
| 4,007,982 | 2/1977 | Stange | 355/299 |
| 4,111,546 | 9/1978 | Maret | 355/297 |
| 4,121,947 | 10/1978 | Hemphill | 134/1 |
| 4,363,992 | 12/1982 | Holze, Jr. | 310/323 |
| 4,546,722 | 10/1985 | Toda et al. | 118/657 |
| 4,684,242 | 8/1987 | Schultz | 355/307 |
| 4,794,878 | 1/1989 | Connors et al. | 118/653 |
| 4,833,503 | 5/1989 | Snelling | 355/259 |
| 4,987,456 | 1/1991 | Snelling et al. | 355/273 |
| 5,005,054 | 4/1991 | Stokes et al. | 355/273 |
| 5,010,369 | 4/1991 | Nowak et al. | 355/273 |
| 5,016,055 | 5/1991 | Pietrowski et al. | 355/273 |
| 5,025,291 | 6/1991 | Nowak et al. | 355/273 |
| 5,030,999 | 7/1991 | Lindblad et al. | 355/297 |
| 5,081,500 | 1/1992 | Snelling | 355/273 |
| 5,210,577 | 5/1993 | Nowak | 355/273 |
| 5,282,005 | 1/1994 | Nowak et al. | 355/273 |

FOREIGN PATENT DOCUMENTS

| | | | |
|---|---|---|---|
| 0490642 | 6/1992 | European Pat. Off. | 355/273 |
| 2280115 | 8/1976 | France . | |
| 52-37042 | 3/1977 | Japan | 355/273 |
| 62-195685 | 8/1987 | Japan . | |

OTHER PUBLICATIONS

Xerox Disclosure Journal, "Floating Diaphragm Vacuum Shoe," Hull et al., vol. 2, No. 6, Nov./Dec. 1977; pp. 117–118.

*Primary Examiner*—William J. Royer

[57] ABSTRACT

A device for coupling and damping a flexible planar imaging member having an interior surface with an insulative support layer moving along an endless path in a movement direction, includes a first electrode member, disposed adjacent to the interior surface of the flexible planar imaging member, for providing sufficient electrostatic force to electrostatically attract the flexible planar imaging member into engagement with the first electrode member.

13 Claims, 4 Drawing Sheets

ELECTROSTATIC COUPLING FORCE ARRANGEMENT FOR APPLYING VIBRATORY MOTION TO A FLEXIBLE PLANAR MEMBER

This invention relates to reproduction apparatus, and more particularly, to an apparatus for uniformly applying high frequency vibratory energy to an imaging surface for electrophotographic applications with optimal energy transfer.

INCORPORATION BY REFERENCE

The following United States patents are specifically incorporated by reference for their background teachings, and specific teachings of the principles of operation, construction and use of resonators for applying toner releasing vibrations to the charge retentive surfaces of electrophotographic devices: U.S. Pat. No. 5,210,577 to Nowak; U.S. Pat. No. 5,030,999 to Lindblad et al.; U.S. Pat. No. 5,005,054, to Stokes et al.; U.S. Pat. No. 4,987,456 to Snelling et al.; U.S. Pat. No. 5,010,369 to Nowak et al.; U.S. Pat. No. 5,025,291 to Nowak et al.; U.S. Pat. No. 5,016,055 to Pietrowski et al.; U.S. Pat. No. 5,081,500 to Snelling; U.S. Pat. No. 5,282,005 "Cross Process Vibrational Mode Suppression in High Frequency Vibratory Energy Producing Devices for Electrophotographic Imaging" by W. Nowak et al.; and U.S. patent application Ser. No. 07/620,520 (abandoned), "Energy Transmitting Horn Bonded to an Ultrasonic Transducer for Improved Uniformity at the Horn Tip", by R. Stokes et al.

BACKGROUND OF THE INVENTION

In electrophotographic applications such as xerography, a charge retentive surface is electrostatically charged and exposed to a light pattern of an original image to be reproduced to selectively discharge the surface in accordance therewith. The resulting pattern of charged and discharged areas on that surface form an electrostatic charge pattern (an electrostatic latent image) conforming to the original image. The latent image is developed by contacting it with a finely divided electrostatically attractable powder or powder suspension referred to as "toner". Toner is held on the image areas by the electrostatic charge on the surface. Thus, a toner image is produced in conformity with a light image of the original being reproduced. The toner image may then be transferred to a substrate (e.g., paper), and the image affixed thereto to form a permanent record of the image to be reproduced. Subsequent to development, excess toner left on the charge retentive surface is cleaned from the surface. The process is well known and useful for light lens copying from an original and printing applications from electronically generated or stored originals, where a charged surface may be imagewise discharged in a variety of ways. Ion projection devices where a charge is imagewise deposited on a charge retentive substrate operate similarly. In a slightly different arrangement, toner may be transferred to an intermediate surface, prior to retransfer to a final substrate.

Transfer of toner from the charge retentive surface to the final substrate is commonly accomplished electrostatically. A developed toner image is held on the charge retentive surface with electrostatic and mechanical forces. A substrate (such as a copy sheet) is brought into intimate contact with the surface, sandwiching the toner thereinbetween. An electrostatic transfer charging device, such as a corotron, applies a charge to the back side of the sheet, to attract the toner image to the sheet.

Unfortunately, the interface between the sheet and the charge retentive surface is not always optimal. Particularly with non-flat sheets, such as sheets that have already passed through a fixing operation such as heat and/or pressure fusing, or perforated sheets, or sheets that are brought into imperfect contact with the charge retentive surface, the contact between the sheet and the charge retentive surface may be non-uniform, characterized by gaps where contact has failed. There is a tendency for toner not to transfer across these gaps. A copy quality defect results.

That acoustic agitation or vibration of a surface can enhance toner release therefrom is known, as described by U.S. Pat. No. 4,111,546 to Maret, U.S. Pat. No. 4,684,242 to Schultz, U.S. Pat. No. 4,007,982 to Stange, U.S. Pat. No. 4,121,947 to Hemphill, Xerox Disclosure Journal "Floating Diaphragm Vacuum Shoe, by Hull et al., Vol. 2, No. 6, November/December 1977, U.S. Pat. No. 3,653,758 to Trimmer et al., U.S. Pat. No. 4,546,722 to Toda et al., U.S. Pat. No. 4,794,878 to Connors et al., U.S. Pat. No. 4,833,503 to Snelling, Japanese Published Patent Application 62-195685, U.S. Pat. No. 3,854,974 to Sato et al., and French patent No. 2,280,115.

Resonators for applying vibrational energy to some other member are known, for example in U.S. Pat. No. 4,363,992 to Holze, Jr., U.S. Pat. No. 3,113,225 to Kleesattel et al., U.S. Pat. No. 3,733,238 to Long et al., and U.S. Pat. No. 3,713,987 to Low.

Coupling of vibrational energy to a surface has been considered in Defensive Publication T893,001 by Fisler. U.S. Pat. No. 3,635,762 to Ott et al., U.S. Pat. No. 3,422,479 to Jeffee, U.S. Pat. No. 4,483,034 to Ensminger and U.S. Pat. No. 3,190,793 Starke.

Resonators coupled to the charge retentive surface of an electrophotographic device at various stations therein, for the purpose of enhancing the electrostatic function, are known, as in: U.S. Pat. No. 5,210,577 to Nowak; U.S. Pat. No. 5,030,999 to Lindblad et al.; U.S. Pat. No. 5,005,054, to Stokes et al.;; U.S. Pat. No. 5,010,369 to Nowak et al.; U.S. Pat. No. 5,025,291 to Nowak et al.; U.S. Pat. No. 5,016,055 to Pietrowski et al.; U.S. Pat. No. 5,081,500 to Snelling; U.S. patent application Ser. No. 08/003906 "Cross Process Vibrational Mode Suppression in High Frequency Vibratory Energy Producing Devices for Electrophotographic Imaging" by W. Nowak et al., and U.S. patent application Ser. No. 07/620,520, "Energy Transmitting Horn Bonded to an Ultrasonic Transducer for Improved Uniformity at the Horn Tip", by R. Stokes et al. Among the problems addressed in these references are uniformity of vibration, coupling of energy, optimal positioning within the transfer field, and the use in association with cleaning devices.

The utilization of a vacuum coupling arrangement is described in U.S. Pat. No. 4,987,456. A vacuum is applied by forming a vacuum chamber which surrounds the transducer with a photoconductive member p/r as an enclosing side of the chamber. This serves two main functions. One being to maintain the photoconductive member in intimate contact with the ultrasonic transducer with sufficient normal force such that coupling of the ultrasonic energy from the transducer into the photoconductive member can occur. Secondly, it is necessary to isolate the vibratory energy such that it vibrates the toner only in the xerographic transfer zone to prevent toner image disturbance. This is accomplished due to the normal force applied to the photoconductive member onto the surface of the vacuum chamber wall positioned upstream from the transducer in the process direction. While the vacuum coupling approach functions satisfactorily, the expense associated with the necessary hardware and vacuum pump are relatively high compared to the total cost associated with the Acoustic Transfer Assist hardware. In addition, the vacuum coupling creates additional machine noise, real estate, and potential reliability limitations. For these reasons, an alternative approach for coupling/damping is desirable.

All the references cited herein are specifically incorporated by reference for their teachings.

SUMMARY OF THE INVENTION

In accordance with the invention there is provided a device for coupling and damping a flexible planar imaging member having an interior surface with an insulative support layer moving along an endless path in a movement direction, includes a first electrode member, disposed adjacent to the interior surface of the flexible planar imaging member, for providing sufficient electrostatic force to electrostatically attract the flexible planar imaging member into engagement with the first electrode member.

In accordance with another aspect of the invention there is provided an imaging device having a non-rigid member with a charge retentive surface, moving along an endless path. Means are provided for creating a latent image on the charge retentive surface. Means are provided for imagewise developing the latent image with toner. Means are provided for electrostatically transferring the developed toner image to a copy sheet in contact with said charge retentive surface, and means for enhancing transfer of said developed image to said copy sheet. The transfer enhancing means includes a resonator, producing relatively high frequency vibratory energy, and having a portion thereof adapted for contact across the non-rigid member, generally transverse to the direction of movement thereof. An electrode, adjacent to said resonator portion, provides sufficient electrostatic force to electrostatically attract the non-rigid member into engagement with the electrode and the resonator portion. Means are provided for driving the resonator to produce relatively high frequency vibratory energy. The invention has equal application to the cleaning station, where mechanical release of toner prior to mechanical, electrostatic or electromechanical cleaning will improve the release of residual toner remaining after transfer.

These and other aspects of the invention will become apparent from the following description used to illustrate a preferred embodiment of the invention read in conjunction with the accompanying drawings in which.

Reproduction machines of the type contemplated for use with the present invention are well known and need not be described herein. U.S. Pat. No. 5,210,577 to Nowak; U.S. Pat. No. 5,030,999 to Lindblad et al.; U.S. Pat. No. 5,005,054, to Stokes et al.; U.S. Pat. No. 4,987,456 to Snelling et al.; U.S. Pat. No. 5,010,369 to Nowak et al.; U.S. Pat. No. 5,025,291 to Nowak et al.; U.S. Pat. No. 5,016,055 to Pietrowski et al.; U.S. Pat. No. 5,081,500 to Snelling; U.S. patent application Ser. No. 08/003,906 "Cross Process Vibrational Mode Suppression in High Frequency Vibratory Energy Producing Devices for Electrophotographic Imaging" by W. Nowak et al., and U.S. patent application Ser. No. 07/620,520, "Energy Transmitting Horn Bonded to an Ultrasonic Transducer for Improved Uniformity at the Horn Tip", by R. Stokes et al. adequately describe such devices, and the application of transfer improving vibration inducing devices, and are specifically incorporated herein by reference.

Figure 1:
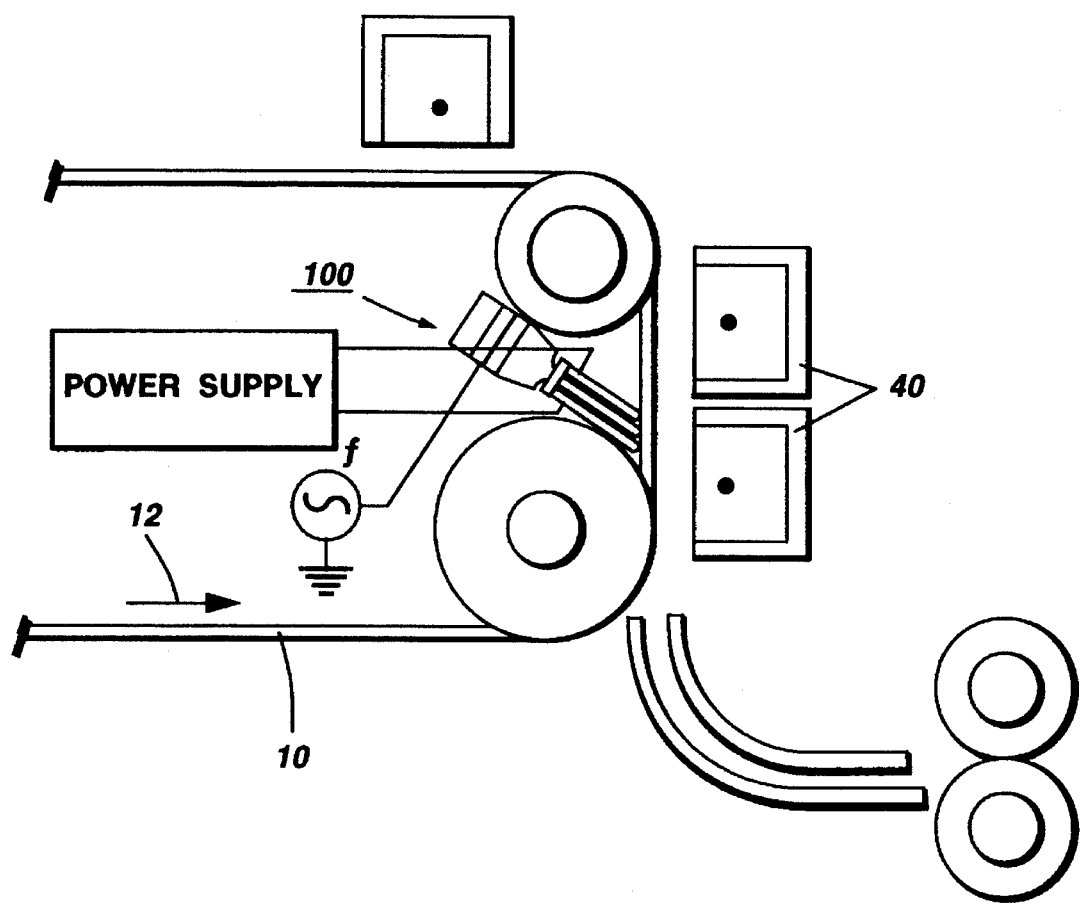
FIG. 1 is a schematic elevational view of a transfer station and an associated ultrasonic transfer enhancement device of the invention.

With reference to FIG. 1, wherein a portion of a reproduction machine is shown including at least portions of the transfer, detack and precleaning functions thereof, the basic principle of enhanced toner release is illustrated, where a relatively high frequency acoustic or ultrasonic resonator 100 driven by an A.C. source 102 operated at a frequency f between 20 kHz and 200 kHz, is arranged in vibrating relationship with the interior or back side of an image receiving belt 10, at a position closely adjacent to where the belt passes through a transfer station. Vibration of belt 10 agitates toner developed in imagewise configuration onto belt 10 for mechanical release thereof from belt 10, allowing the toner to be electrostatically attracted to a sheet during the transfer step, despite gaps caused by imperfect paper contact with belt 10. Additionally, increased transfer efficiency with lower transfer fields than normally used appears possible with the arrangement. Lower transfer fields are desirable because the occurrence of air breakdown (another cause of image quality defects) is reduced. Increased toner transfer efficiency is also expected in areas where contact between the sheet and belt 10 is optimal, resulting in improved toner use efficiency, and a lower load on the cleaning system. In a preferred arrangement, the resonator 100 is arranged with a vibrating surface parallel to belt 10 and transverse to the direction of belt movement 12, generally with a length approximately coextensive with the belt width. The belt described herein has the characteristic of being non-rigid, or somewhat flexible, to the extent that it can be made to follow the resonator vibrating motion. One type of photoconductive imaging member is typically multilayered and has a substrate, a conductive layer, an optional adhesive layer, an optional hole blocking layer, a charge generating layer, a charge transport layer, and, in some embodiments, an anticurl backing layer.

Figure 2:
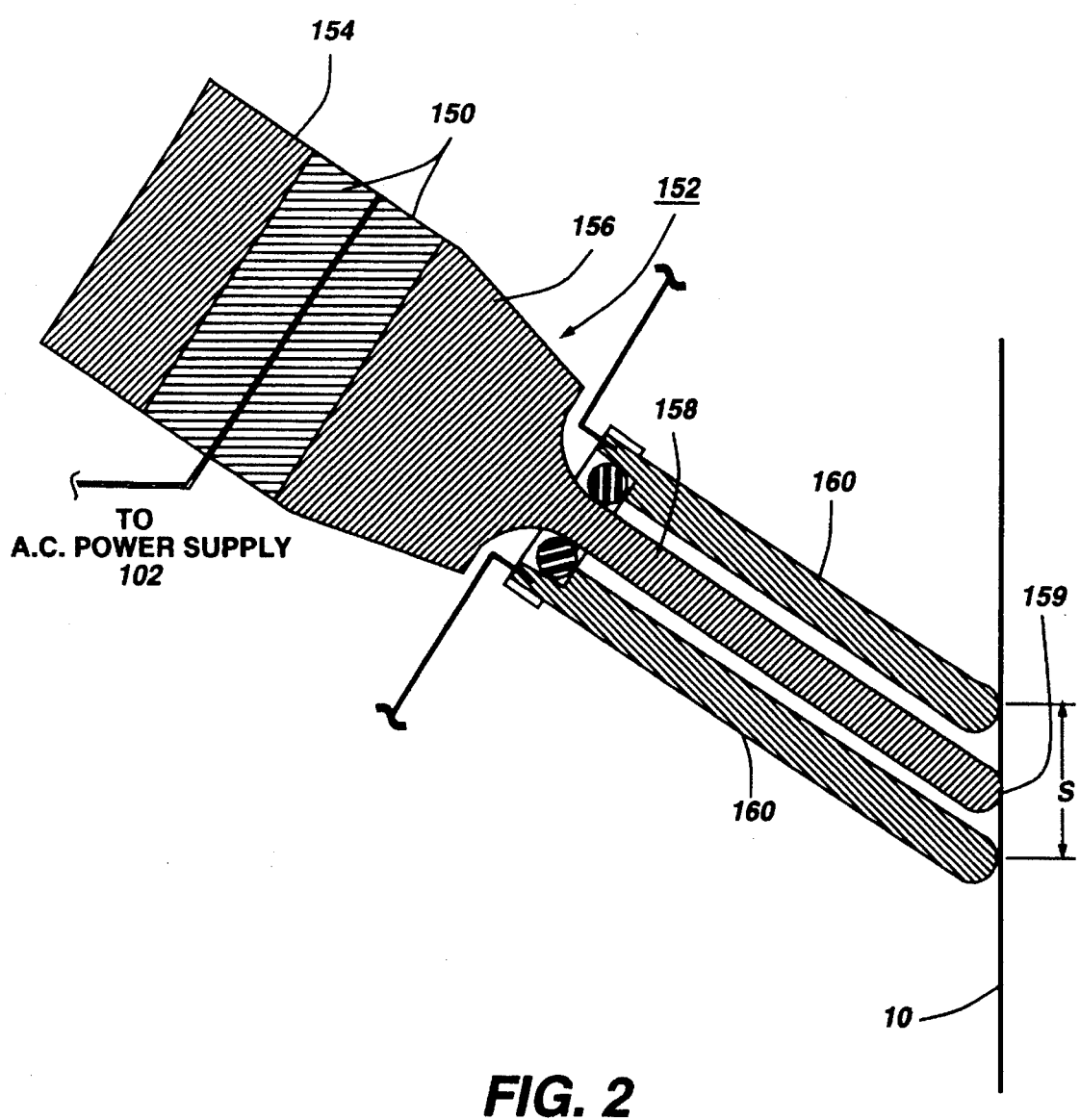
FIG. 2 is a sectional elevational view of an electrostatic coupling assembly in accordance with the invention.

With reference to FIGS. 1 and 2, and better shown in FIG. 2, the vibratory energy of the resonator 100 may be coupled to belt 10 in a number of ways. In the arrangements shown, resonator 100 may comprise a piezoelectric transducer element 150 and horn 152, together supported on a backplate 154. Horn 152 includes a platform portion 156 and a horn tip 158 and a contacting tip 159 in contact with belt 10 to impart the ultrasonic energy of the resonator thereto. To hold horn 152 and the piezoelectric transducer element 150, an adhesive such as an epoxy and conductive mesh layer may be used to bond the horn and piezoelectric transducer element together. In a working example, the mesh was a nickel coated monofilament polyester fiber (from Tetko, Inc.) with a mesh thickness on the order of 0.003" thick encapsulated in a thermosetting epoxy having a thickness of 0.005" (before compression and heating). Other meshes, including metallic meshes of phosphor bronze and Monel may be satisfactory. Two part cold setting epoxies may also be used, as may other adhesives. Alternatively, a bolt and nut arrangement may be used to clamp the assembly together.

In the fabrication of the arrangement, the epoxy and conductive mesh layer are sandwiched between the horn and piezoelectric material, and clamped to ensure good flow of the epoxy through the mesh and to all surfaces. It appears to be important that the maximum temperature exposure of the PZT be about 50% of its curie point. Epoxies are available with curing temperatures of 140°, and piezoelectric materials are available from 195° to 350°. Accordingly, an epoxy—PZT pair is preferably selected to fit within this limitation.

The contacting tip 159 of horn 152 may be brought into a tension or penetration contact with belt 10, so that movement of the tip carries belt 10 in vibrating motion. Penetration can be measured by the distance that the horn tip protrudes beyond the normal position of the belt, and may be in the range of 1.5 to 3.0 mm. It should be noted that increased penetration produces a ramp angle at the point of penetration. For particularly stiff sheets, such an angle may tend to cause lift at the trail edges thereof.

The coupling arrangement provides for transmitting vibratory energy from a resonator 100 to photoreceptor 10, the resonator is arranged with electrodes 160 of the present invention to provide engagement of resonator 100 to photoreceptor 10 without penetrating the normal plane of the photoreceptor.

Horn tip 158 extends through electrodes 160, which is connected to a high voltage source. Electrodes 160 are approximately parallel to horn tip 158, extending to approximately a common plane with the contacting tip 159, and forming together an opening adjacent to the photoreceptor belt 10, at which the contacting tip contacts the photoreceptor. When voltage is applied by a high voltage supply (not shown) to electrodes 160, belt 10 is drawn into contact with electrodes 160 and contacting tip 159, so that contacting tip 159 imparts the ultrasonic energy of the resonator to belt 10. Interestingly, electrodes 160 also tend to damp vibration of the belt outside the area in which vibration is desired, so that the vibration does not disturb the dynamics of the sheet tacking or detacking process, or the integrity of the developed image prior to the transfer field.

The electrostatic tacking force can be applied using either D.C. or A.C. biases to promote electrostatic fields into the bulk of the photoreceptor backside. This can occur without effecting the photoreceptor imaging function. It is preferred that the photoreceptor structure consists of the electrically insulative Anti-Curl Backing Coating in direct contact with the resonator followed by the Mylar support layer. These insulative layers occur prior to the photoreceptor ground plane in the photoreceptor structure which serves to electrically isolate the electrostatic tacking function from the photoreceptor imaging function. The biases can be applied to the electrodes and/or directly to the contacting tip to enhance the coupling effect. The electrodes also, may be implemented, for example, as a conductive roller, can be employed to rotate in the same direction and have the same tangential velocity as belt 10. Also, shoes similar to the plenum walls may be used. If desirable, the electrode can be overcoated to prevent wear and/or to reduce drag forces. For example a teflon overcoating, or even carbon loaded teflon to provide conductivity, metal or conducting polymers or polymer composites may also be employed.

Figure 3A:
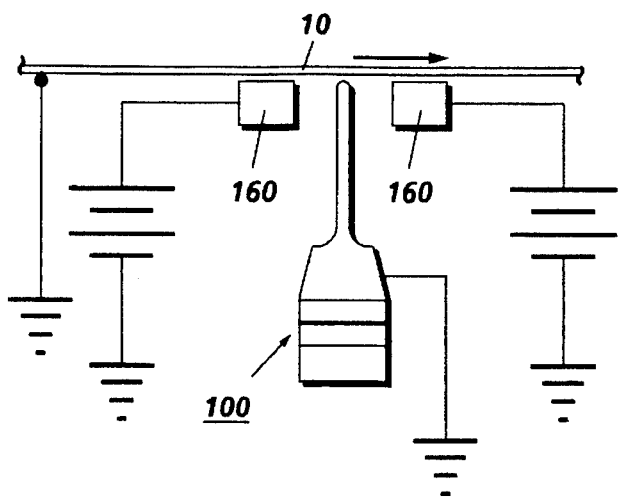
FIGS. 3A–3C are schematic elevational view of various embodiments of the present invention.
Figure 3B:
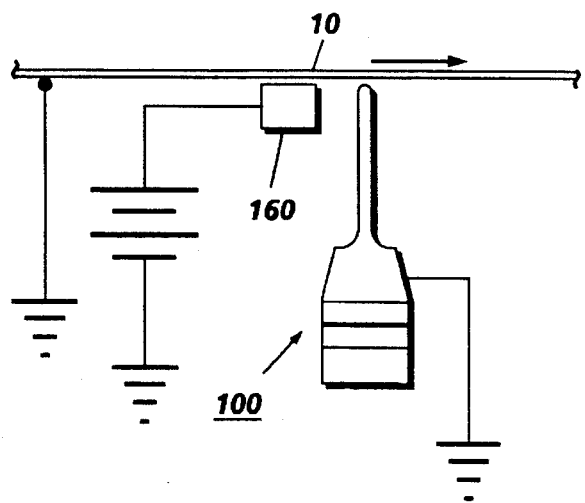
Figure 3C:
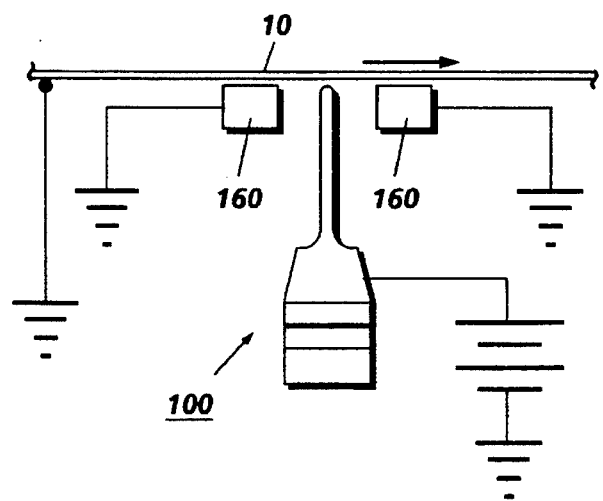

Various embodiments may be applied to achieve the necessary coupling and damping functions, as shown in FIGS. 3A–3C. One approach is to apply alternating polarity D.C. biases to adjacently positioned electrodes or to one electrode and the contacting tip. This promotes lateral and normal electrostatic field components within the photoconductive member backing layers. In another embodiment, one electrode positioned upstream in the process direction provides for vibration damping prior to toner transfer to paper.

This embodiment facilitates the reduction of frictional drag forces on the photoconductive member. Also, D.C. bias applied to an electrode and/or the contacting tip or to the photoconductive member ground plane to induce fields across the bulk of photoconductive member backing layer thereby promote a normal field component onto the photoconductive member toward the resonator.

It should be evident that A.C. bias applied to an electrode and/or the resonator tip can also be applied to provide the required normal force for coupling and damping. The frequency of the A.C. bias is selected based upon the relaxation time of the insulative support layer. This may be applied in conjunction with a D.C. bias or not. The A.C. bias can also serve to neutralize any residual charge occurring on the backside of the photoconductive member so as to not incur drag forces elsewhere within the photoconductive member module. If desirable, one may include a neutralizing brush, for instance, to dissipate charge built up on the photoconductive member backside. Removal of the residual charge insures consistent normal force application. It should be noted that since the electrostatic forces are dependent upon the square of the separation, it is preferred to bring the photoreceptor into close contact with the electrodes.

Application of high frequency acoustic or ultrasonic energy to belt 10 occurs within the area of application of transfer field, and preferably within the area under transfer corotron 40. While transfer efficiency improvement appears to be obtained with the application of high frequency acoustic or ultrasonic energy throughout the transfer field, in determining an optimum location for the positioning of resonator 100, it has been noted that transfer efficiency improvement is strongly a function of the velocity of the contacting tip 159. The desirable position of the resonator is approximately opposite the centerline of the transfer corotron. For this location, optimum transfer efficiency was achieved for tip velocities in the range of 300–500 mm/sec. depending on toner mass. At very low tip velocity, from 0 mm/second to 45 mm/sec, the positioning of the transducer has relatively little effect on transfer characteristics. Restriction of application of vibrational energy, so that the vibration does not occur outside the transfer field is preferred. Application of vibrational energy outside the transfer field tends to cause greater electromechanical adherence of toner to the surface creating a problem for subsequent transfer or cleaning.

Figure 4A:
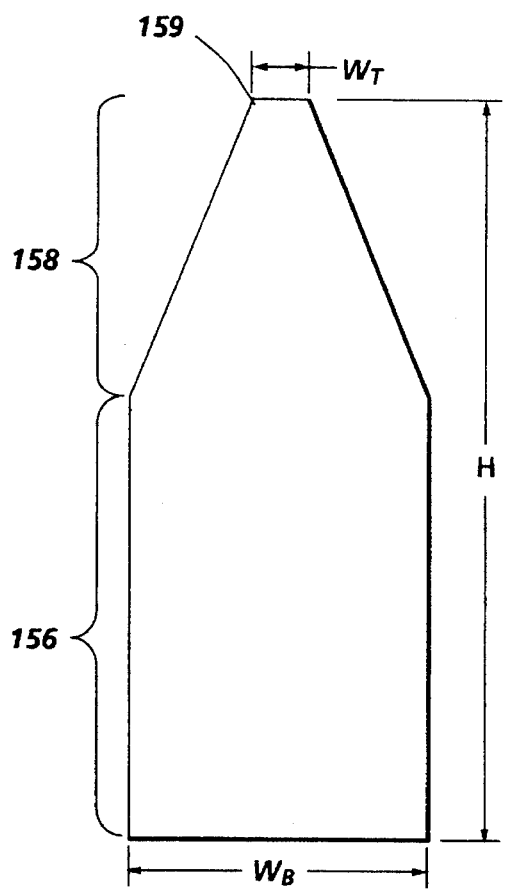
FIGS. 4A and 4B are elevational views of two types of horns suitable for use with the invention.
Figure 4B:
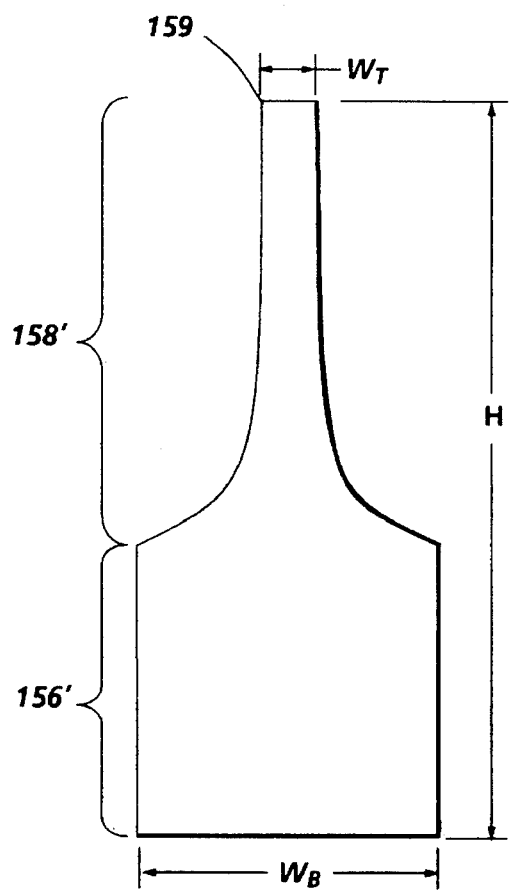

At least two shapes for the horn have been considered. With reference to FIG. 4A, in cross section, the horn may have a trapezoidal shape, with a generally rectangular base 156 and a generally triangular tip portion 158, with the base of the triangular tip portion having approximately the same size as the base. Alternatively, as shown in FIG. 4B, in cross section, the horn may have what is referred to as a stepped shape, with a generally rectangular base portion 156', and a stepped horn tip 158'. The trapezoidal horn appears to deliver a higher natural frequency of excitation, while the stepped horn produces a higher amplitude of vibration. The height H of the horn appears to have an effect on the frequency and amplitude response. Desirably the height H of the horn will fall in the range of approximately 1 to 1.5 inches (2.54 to 3.81 cm), with greater or lesser lengths not excluded. The ratio of the base width $W_B$ to tip width $W_T$ also effects the amplitude and frequency of the response with a higher ratio producing a marginally higher frequency and a greater amplitude of vibration. The ratio of $W_B$ to $W_T$ is desirably in the range of about 3:1 to about 10:1. The length L of the horn across belt 10 also effects the uniformity of vibration, with the longer horn producing a less uniform response. A desirable material for the horn is aluminum. Satisfactory piezoelectric materials, including lead zirconate-lead titanate composites sold under the trademark PZT by Vernitron, Inc. (Bedford, Ohio), have high $D_{33}$ values. Suitable materials may also be available from Motorola Corporation, Albuquerque, N. Mex. Displacement constants are typically in the range of $400–500^m/_v \times 10^{-12}$. There may be other sources of vibrational energy, which clearly support the present invention, including but not limited to magnetostriction and electrodynamic systems.

It should be evident that the electrostatic coupling arrangement may be implemented in conjunction with other coupling methods, to include, for example, vacuum coupling to further improve coupling between the resonator and the flexible image member.

It will no doubt be appreciated that the inventive resonator and electrostatic coupling arrangement has equal application in the cleaning station of an electrophotographic device with little variation in structure.

As a means for improving uniformity of application of vibratory energy to a flexible member for the release of toner therefrom, the described resonator may find numerous uses in electrophotographic applications. One example of a use may be in causing release of toner from a toner bearing donor belt, arranged in development position with respect to a latent image. Enhanced development may be had, with mechanical release of toner from the donor belt surface and electrostatic attraction of the toner to the image.

The invention has been described with reference to a preferred embodiment. It should be appreciated that the present invention can be employed in various applications which requires control of spacings of a moving web or photoreceptor belt, for example in the exposure zone, development zone, transfer zone or cleaning zone. Obviously modifications will occur to others upon reading and understanding the specification taken together with the drawings. This embodiment is but one example, and various alternatives, modifications, variations or improvements may be made by those skilled in the art from this teaching which are intended to be encompassed by the following claims.

I claim:

1. A device for damping a flexible, substantially planar imaging member moving in a movement direction, comprising:
    a first electrode member, disposed adjacent to a surface of the imaging member, for providing sufficient electrostatic force to electrostatically attract the imaging member into engagement with said first electrode member;
    a power source, connected to said first electrode member, for generating the electrostatic force; and
    a second electrode member spaced from said first mentioned electrode member.

2. The device of claim 1, wherein said power source supplies an AC bias to said first electrode member.

3. The device of claim 2, wherein the imaging member includes an insulative support layer with the frequency of the A.C. bias being selected as a function of the insulative support layer relaxation time.

4. The device of claim 1, wherein said power source supplies an alternating polarity D.C. bias to said first electrode member and said second electrode member.

5. In a printing machine having a visible image formed on a substantially non-rigid member adapted to move in a direction of movement with the visible image being transferred to a receiving member, wherein the improvement comprises:
    a resonator, producing relatively high frequency vibratory energy, and including a portion thereof adapted to contact across the non-rigid member, generally transverse to the direction of movement thereof;
    a first electrode member, adjacent to said resonator portion, for providing sufficient electrostatic force to electrostatically attract the non-rigid member into engagement with said first electrode member and said resonator portion; and
    means for driving the resonator to produce relatively high frequency vibratory energy.

6. The printing machine as defined in claim 5, wherein the non-rigid member includes an exterior surface, having the visible image formed thereon, and an interior surface opposed from the exterior surface, including an insulative support layer, said resonator being operatively coupled to said interior surface.

7. The printing machine of claim 6, further comprising a power source, connected to said first electrode member, for generating the electrostatic force.

8. The printing machine of claim 7, further comprising a second electrode member spaced from said first electrode member.

9. The printing machine of claim 8, wherein said power source supplies an AC bias to said first electrode member or said second electrode member.

10. The printing machine of claim 9, wherein the frequency of the A.C. bias being selected as a function of the insulative support layer relaxation time.

11. The printing machine of claim 8, wherein said power source supplies an alternating polarity D.C. bias to said first electrode member and said second electrode member.

12. The printing machine of claim 8, wherein said second electrode member includes said resonator portion.

13. The printing machine of claim 8, wherein said second electrode member is adjacent to said resonator and opposed from said first electrode member.

* * * * *